July 20, 1965
M. G. McCLURE
3,195,509
GUARD FOR POULTRY FOUNTAINS
Filed June 3, 1963
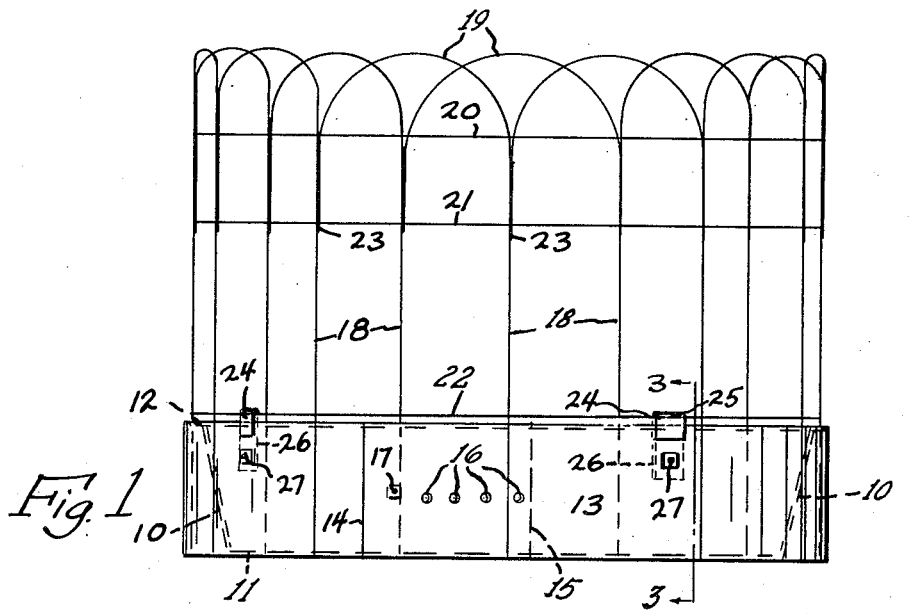
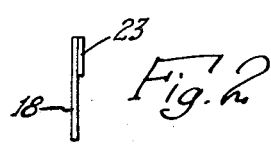
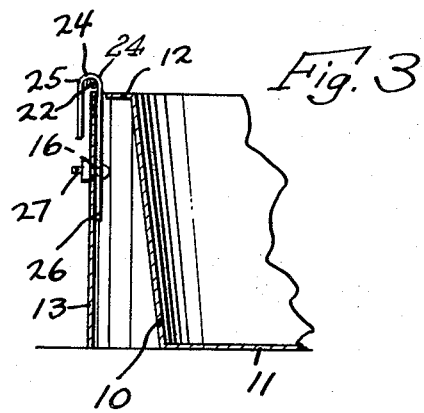
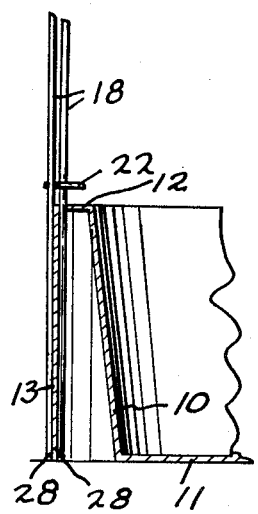
INVENTOR.
Melvin G. McClure
BY
Sam J. Slotsky
ATTORNEY

United States Patent Office 3,195,509
Patented July 20, 1965

3,195,509
GUARD FOR POULTRY FOUNTAINS
Melvin G. McClure, Virgil, S. Dak.
Filed June 3, 1963, Ser. No. 285,029
2 Claims. (Cl. 119—61)

My invention relates to a guard for poultry fountains.

An object of my invention is to provide a guard which will restrict the creature's head while drinking so that the chicken or hen will not unduly scatter water around the pan from which it is drinking.

A further object of my invention is to provide this arrangement so that the hens' feet will stay clean and the eggs will not become unduly soiled from wet litter, etc.

A further object of my invention is to provide a fountain guard of this character which will maintain the health of the birds, reduce labor, and provide other advantages as well.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a forward elevation of my guard as applied to a drinking pan,

FIGURE 2 is an enlarged detail,

FIGURE 3 is an enlarged sectional view taken along the lines 3—3 of FIGURE 1, and FIGURE 4 is a modification.

My invention relates to a fountain guard which besides the advantages mentioned herein above, include features wherein the base of the guard can be adjusted to different diameters of pans, etc.

In describing my invention, I have used the character 10 to designate the side walls of a pan for receiving water from which pan the birds will drink, the character 11 indicating the bottom wall, and the character 12 indicating a peripheral flange.

I have further used the character 13 to indicate a lengthened sheet of metal preferably bent into a circle shape, the character 14 indicating one edge and the character 15 the other edge, the character 16 indicating a series of spaced openings adapted to receive the bolt and nut arrangement 17 whereby the diameter and circumference of the member 13 can be made consistent with the size of the pan itself.

I have further used the character 18 to indicate the vertical portions of a portion of the guard which portions extend into the upper arcuate portions 19, the character 20 indicating horizontally positioned circular portions and the character 21 and 22 indicating further horizontally positioned circular wire portions.

These members are usually made of wire twisted together appropriately and at the points 23 (see FIG. 2), the vertical members 18 continue downwardly in a single wire only. The members 18 (see FIGS. 1 and 4) alternately are placed outside of the member 13 and then inside, or in other words, every other member will be outside and as shown in FIGURE 1.

To secure the upper cage structure, I have provided the clips 24 which are bent at 25 to receive the member 22, these clips extending downwardly into the portions 26 and being secured to the member 13 by means of the bolt and nut arrangement 27, which will thereby securely support the cage arrangement.

A further alternative arrangement is shown in FIGURE 4 wherein the lower ends of the members 18 can be suitably spot welded as at 28.

It will now be noted that I have provided a guard which is useful in that it provides desirable features as follows. Since the chickens will usually shake their heads after drinking water, and whereby the droplets would thereby cause a messy contaminated condition, so that the hens' feet are muddy causing harmful effects to the eggs and the like, it will be noted that by use of this device, since the hens drink between the bars 18 etc., when they raise their heads, they will not attempt to shake their heads thereby eliminating the above mentioned objectionable features.

The guard is easily installed and when made in the form shown can be made of larger diameter with the base member 13 accommodating such larger diameters.

It will now be seen that I have provided the advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A guard for poultry fountains comprising a substantially circular guard member adapted to surround a watering unit, said guard member including a plurality of peripherally spaced substantially vertical bars for providing restricted lateral areas, a vertically positioned cylindrical base member to which said bars are attached, means for attaching said bars in alternately external and internal relation to said base member, said guard member including a circular further horizontally positioned bar positioned adjacently to the top of said base member, said attaching means including clips attached to said further bar and said base member.

2. A guard for poultry fountains comprising a substantially circular guard member adapted to surround a watering unit, said guard member including a plurality of peripherally spaced substantially vertical bars for providing restricted lateral areas, a vertically positioned cylindrical base member to which said bars are attached, means for attaching said bars in alternately external and internal relation to said base member, said guard member including a circular further horizontally positioned bar positioned adjacently to the top of said base member, said attaching means including clips attached to said further bar and said base member, means for adjusting said base member to various diameters.

References Cited by the Examiner
UNITED STATES PATENTS

| | | | |
|---|---|---|---|
| 1,050,732 | 1/13 | Gibbens | 119—72 |
| 1,580,484 | 4/26 | Hadland | 119—51 |
| 1,906,016 | 4/33 | Stecher | 119—61 |

SAMUEL KOREN, Primary Examiner.

HUGH R. CHAMBLEE, Examiner.